United States Patent
Kaliswamy et al.

(10) Patent No.: US 12,445,497 B2
(45) Date of Patent: Oct. 14, 2025

(54) APPARATUS, METHOD, AND COMPUTER PROGRAM FOR FORWARDING E2 COMMUNICATION IN A NETWORK

(71) Applicant: Rakuten Symphony, Inc., Tokyo (JP)

(72) Inventors: Prabhu Kaliswamy, Andaman and Nicobar Islands (IN); Raghavendran Ramiya, Karnataka (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/273,585

(22) PCT Filed: Jun. 28, 2023

(86) PCT No.: PCT/US2023/026433
§ 371 (c)(1),
(2) Date: Jul. 21, 2023

(87) PCT Pub. No.: WO2025/005913
PCT Pub. Date: Jan. 2, 2025

(65) Prior Publication Data
US 2025/0097266 A1    Mar. 20, 2025

(51) Int. Cl.
| | |
|---|---|
| G06F 15/16 | (2006.01) |
| G06F 9/54 | (2006.01) |
| H04L 9/40 | (2022.01) |
| H04L 29/06 | (2006.01) |
| H04L 61/00 | (2022.01) |
| H04L 61/255 | (2022.01) |

(52) U.S. Cl.
CPC ............ *H04L 63/20* (2013.01); *H04L 61/255* (2013.01); *H04L 61/35* (2013.01)

(58) Field of Classification Search
CPC ....... H04L 63/20; H04L 61/255; H04L 61/35; H04L 12/66; H04L 45/00; H04W 40/24
USPC .......................................................... 726/26
See application file for complete search history.

(56) References Cited

U.S. PATENT DOCUMENTS

| | | | | |
|---|---|---|---|---|
| 2022/0330070 | A1* | 10/2022 | Song | H04W 28/0268 |
| 2022/0407890 | A1* | 12/2022 | Saroiu | H04L 63/0428 |
| 2023/0199552 | A1* | 6/2023 | Bahl | H04W 12/08 |
| | | | | 398/79 |

(Continued)

FOREIGN PATENT DOCUMENTS

| | | | | |
|---|---|---|---|---|
| EP | 4312446 A1 * | 1/2024 | ......... | H04W 88/085 |
| ID | P202407365 A * | 9/2024 | | |

(Continued)

*Primary Examiner* — Hamza N Algibhah
(74) *Attorney, Agent, or Firm* — Sughrue Mion, PLLC

(57) ABSTRACT

Provided are apparatus, method, and device capable of forwarding E2 communication a network. According to embodiments, the apparatus may include: at least one memory storage storing computer-executable instructions; and at least one processor communicatively coupled to the at least one memory storage, wherein the at least one processor may be configured to execute the instructions to: obtain a mapping between a first IP address of an instance of E2 Termination deployed at the Near-RT RIC and at least one second IP address of at least one E2 node associated with the instance of E2 Termination; receive a data from an E2 node; determine whether to directly transmit the data to the instance of E2 Termination based on the mapping.

20 Claims, 11 Drawing Sheets

(56) References Cited

U.S. PATENT DOCUMENTS

| | | | |
|---|---|---|---|
| 2023/0199867 A1* | 6/2023 | Song | H04W 92/12 |
| | | | 370/328 |
| 2023/0319662 A1* | 10/2023 | Sivaraj | H04W 36/008375 |
| | | | 455/436 |
| 2024/0357458 A1* | 10/2024 | Jamadagni | H04L 5/0055 |
| 2024/0414626 A1* | 12/2024 | Prasad | H04B 7/04013 |
| 2025/0031081 A1* | 1/2025 | Yadav | H04W 24/08 |
| 2025/0056568 A1* | 2/2025 | Yang | H04W 40/24 |

FOREIGN PATENT DOCUMENTS

| | | | | |
|---|---|---|---|---|
| RU | 2834656 C2 * | 2/2025 | | |
| WO | WO-2021176092 A1 * | 9/2021 | | H04L 67/535 |
| WO | WO-2022103210 A1 * | 5/2022 | | H04W 76/22 |
| WO | WO-2022220640 A1 * | 10/2022 | | H04W 88/12 |
| WO | WO-2023027531 A1 * | 3/2023 | | H04W 48/12 |

* cited by examiner

APPARATUS, METHOD, AND COMPUTER PROGRAM FOR FORWARDING E2 COMMUNICATION IN A NETWORK

CROSS REFERENCE TO RELATED APPLICATIONS

This application is a National Stage of International Application No. PCT/US2023/026433 filed Jun. 28, 2023.

TECHNICAL FIELD

Apparatuses, methods, and computer programs consistent with example embodiments of the present disclosure relate to a telecommunication network, and more specifically, relate to forwarding E2 communication to an instance of E2 Termination of a near-real-time radio access network (RAN) intelligent controller (Near-RT RIC), in a telecommunication network.

BACKGROUND

A radio access network (RAN) is an important component in a telecommunications system, as it connects end-user devices (or user equipment) to other parts of the network. The RAN includes a combination of various network elements (NEs) that connect end-users to a core network. Traditionally, hardware and/or software of a particular RAN is vendor specific.

Open RAN (O-RAN) technology has emerged to enable multiple vendors to provide hardware and/or software to a telecommunications system. Since different vendors are involved, the type of hardware and/or software provided may also be different. That is, different types of NEs may be provided by different vendors, and depending on the specific service, the NE could be virtualized in software form (e.g., virtual machine (VM)-based), or could be in physical hardware form (e.g., non-VM based).

RAN functions in the O-RAN architecture are controlled and optimized by a RAN Intelligent Controller (RIC). The RIC is a software-defined component that implements modular applications to facilitate the multivendor operability required in the O-RAN system, as well as to automate and optimize RAN operations.

The RIC is divided into two types: a non-real-time RIC (Non-RT RIC) and a near-real-time RIC (Near-RT RIC). The Non-RT RIC operates on a timescale greater than 1 second within the Service Management and Orchestration (SMO) framework. Its functionalities are implemented through modular applications called rApps, and include: providing policy based guidance and enrichment across the A1 interface, which is the interface that enables communication between the Non-RT RIC and the Near-RT RIC; performing data analytics; Artificial Intelligence/Machine Learning (AI/ML) training and inference for RAN optimization; and/or recommending configuration management actions over the O1 interface, which is the interface that connects the SMO to RAN managed elements (e.g., Near-RT RIC, O-RAN Centralized Unit (O-CU), O-RAN Distributed Unit (O-DU), etc.).

The Near-RT RIC operates on a timescale between 10 milliseconds and 1 second and is coupled with the O-CU control plane (O-CU-CP), the O-CU user plane (O-CU-UP), and the O-DU via the E2 interface. It hosts xApps to implement functions such as interference mitigation, load balancing, security, etc. The two types of RICs work together to optimize the O-RAN. For example, the Non-RT RIC provides the policies, data, and AI/ML models enforced and used by the Near-RT RIC for RAN optimization.

As mentioned above, the Non-RT RIC is located within the SMO framework, which manages and orchestrates RAN elements. Specifically, the SMO manages and orchestrates what is referred to as the O-RAN Cloud (O-Cloud). The O-Cloud is a collection of physical RAN nodes that host the RICs, O-CUs, and O-DUs, the supporting software components (e.g., the operating systems and runtime environments), and the SMO itself. In other words, the SMO manages the O-Cloud from within.

In further detail, the O-RAN E2 nodes (i.e., the O-CU, O-DU, O-eNB, etc., that are connected to the Near-RT RIC via the E2 interface) are orchestrated on the O-Cloud as Virtualized Network Functions (VNFs) or Cloud Native Functions (CNFs). SMO anchored functionalities (Network Function Orchestrator (NFO), Federated O-Cloud Orchestration and Management (FOCOM), etc.) handle management and orchestration of VNFs/CNFs and the O-Cloud.

In the related art, the E2 interface is introduced as part of O-RAN Work Group 3 Near RT-RIC E2AP Specification for communication between the Near-RT RIC and the E2 nodes, where the latency for communication through the E2 interface should adhere to the requirement for the Near-RT RIC of between 10 milliseconds and 1 second.

However, introduction of O-RAN Work Group 11 Security specification results in the E2 interface being required to support confidentiality, integrity, replay protection and data origin authentication. To this end, the E2 interface may be required to enable IPSec in order to protect the communication through the E2 interface. Such introduction of IPSec on the E2 interface may impact the performance and latency of communication through the E2 interface, which may result in the latency failing the requirement for the Near-RT RIC of between 10 milliseconds and 1 second.

SUMMARY

Example embodiments of the present disclosure forward E2 communication from an E2 Node to an E2 Termination Instance based on a mapping between an IP address of the E2 Termination Instance and an IP address of the E2 Node. As such, example embodiments of the present disclosure improve the latency for communication through the E2 interface and ensure that said latency satisfies the requirement for the Near-RT RIC of between 10 milliseconds and 1 second even when IPSec is implemented on the E2 interface.

According to embodiments, an apparatus is provided. The apparatus may be capable of forwarding E2 communication to a near-real-time radio access network (RAN) intelligent controller (Near-RI RIC), and the apparatus may include: at least one memory storage storing computer-executable instructions; and at least one processor communicatively coupled to the at least one memory storage, wherein the at least one processor may be configured to execute the instructions to: obtain a mapping between a first IP address of an instance of E2 Termination deployed at the Near-RT RIC and at least one second IP address of at least one E2 node associated with the instance of E2 Termination; receive a data from an E2 node; determine whether to directly transmit the data to the instance of E2 Termination based on the mapping.

According to embodiments, a method is provided. The method may be for forwarding E2 communication to a near-real-time radio access network (RAN) intelligent controller (Near-RI RIC), and the method may include: obtaining a mapping between a first IP address of an instance of E2 Termination deployed at the Near-RT RIC and at least one second IP address of at least one E2 node associated with the instance of E2 Termination; receiving a data from an E2 node; determining whether to directly transmit the data to the instance of E2 Termination based on the mapping.

According to embodiments, a non-transitory computer-readable recording medium is provided. The non-transitory computer-readable recording medium may have recorded thereon instructions executable by at least one processor of a system to cause the at least one processor to perform a method for forwarding E2 communication to a near-real-time radio access network (RAN) intelligent controller (Near-RT RIC), and including: obtaining a mapping between a first IP address of an instance of E2 Termination deployed at the Near-RT RIC and at least one second IP address of at least one E2 node associated with the instance of E2 Termination; receiving a data from an E2 node; determining whether to directly transmit the data to the instance of E2 Termination based on the mapping.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

Figure 1:
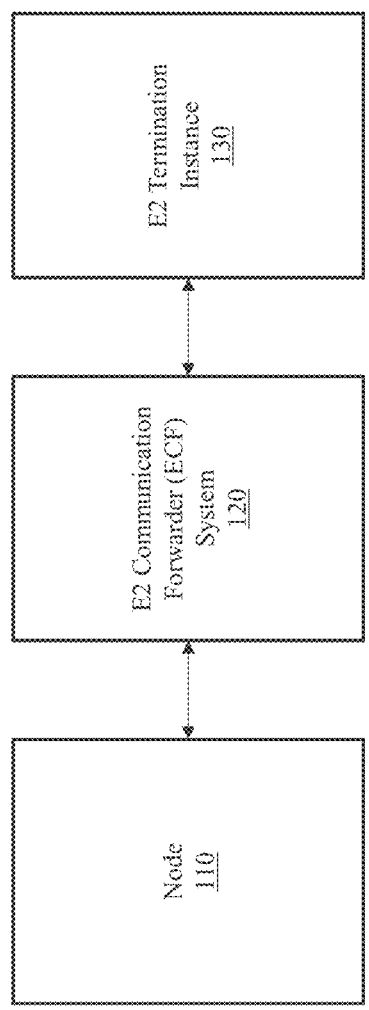
FIG. 1 illustrates a block diagram of an example system configuration for forwarding E2 communication in a network, according to one or more embodiments.

The following detailed description of example embodiments refers to the accompanying drawings. The same reference numbers in different drawings may identify the same or similar elements.

The foregoing disclosure provides illustration and description but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the descriptions of operations provided below, it is understood that one or more operations may be omitted, one or more operations may be added, one or more operations may be performed simultaneously (at least in part), and the order of one or more operations may be switched.

It will be apparent that apparatuses, systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are disclosed in the specification, these combinations are not intended to limit the disclosure of possible implementations. In fact, many of these features may be combined in ways not specifically disclosed in the specification.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Systems, apparatuses, methods, devices, and the like, provided in the example embodiments of the present disclosure forward E2 communication (e.g., forward data packet or traffic), from an E2 Node to an E2 Termination Instance of the Near-RT RIC based on a mapping (e.g., mapping table) between an IP address of the E2 Termination Instance and an IP address of the E2 Node.

According to embodiments, the system may obtain a mapping between an IP address of an E2 Termination Instance and an IP address of an E2 Node that is associated with such E2 Termination Instance, and then in response to receiving a data from a node, determine whether to directly transmit such data to the E2 Termination Instance based on the mapping. For instance, based on determining that the IP address of the node that transmitted the data corresponds to the IP address of the E2 Node in the mapping, the system may directly transmit such data to the E2 Termination Instance.

Ultimately, example embodiments of the present disclosure forward E2 communication from the E2 Node to the E2 Termination Instance of the Near-RT RIC based on the mapping, improve the latency for communication through the E2 interface and ensure that said latency satisfies the requirement for the Near-RT RIC of between 10 milliseconds and 1 second even when IPSec is implemented on the E2 interface.

It is contemplated that features, advantages, and significances of example embodiments described hereinabove are merely a portion of the present disclosure, and are not intended to be exhaustive or to limit the scope of the present disclosure.

Further descriptions of the features, components, configuration, operations, and implementations of the threshold tuning system of the present disclosure, according to one or more embodiments, are provided in the (allowing.

Example System Architecture

FIG. 1 illustrates a block diagram of an example system configuration 100 for forwarding E2 communication in a network, according to one or more embodiments. As illustrated in FIG. 1, system configuration 100 may include an E2 Node 110, an E2 Communication Forwarder (ECF) system 120, and an E2 Termination Instance 130.

E2 Node 110 may include O-CU (including O-CU-CP and O-CU-UP), O-DU, and O-eNB. In some implementations, E2 Node 110 may be communicatively coupled to the ECF system 120 and may transmit and receive data from to the ECF system 120.

The ECF system 120 may include an apparatus, a system, a platform, a module, or the like, which may be configured to perform one or more operations or actions for forwarding E2 communication (data) in a network. According to embodiments, the ECF system 120 may include an E2 traffic forwarder module and a low-level hook module. The E2 traffic forwarder module may be deployed on a cloud platform (O-Cloud) where the Near-RT RIC and xApp are deployed, and may run on user space. The E2 traffic forwarder module may also perform preparation for eBPF programs as well as loading and unloading of the low-level hook module at host kernel dynamically depending on the E2 Termination Instance availability on the cloud platform (O-Cloud).

Example operations performable by the ECF system 120 for forwarding E2 communication are described below with reference to FIG. 6 to FIG. 10. Further, several example components which may be included in the ECF system 120, according to one or more embodiments, are described below with reference to FIG. 2.

E2 Termination Instance 130 may include an instance of an end point for an E2 interface at the Near-RT RIC. In some implementations, E2 Termination Instance 130 may be communicatively coupled to the ECF system 120 and may transmit and receive data from the ECF system 120.

Figure 2:
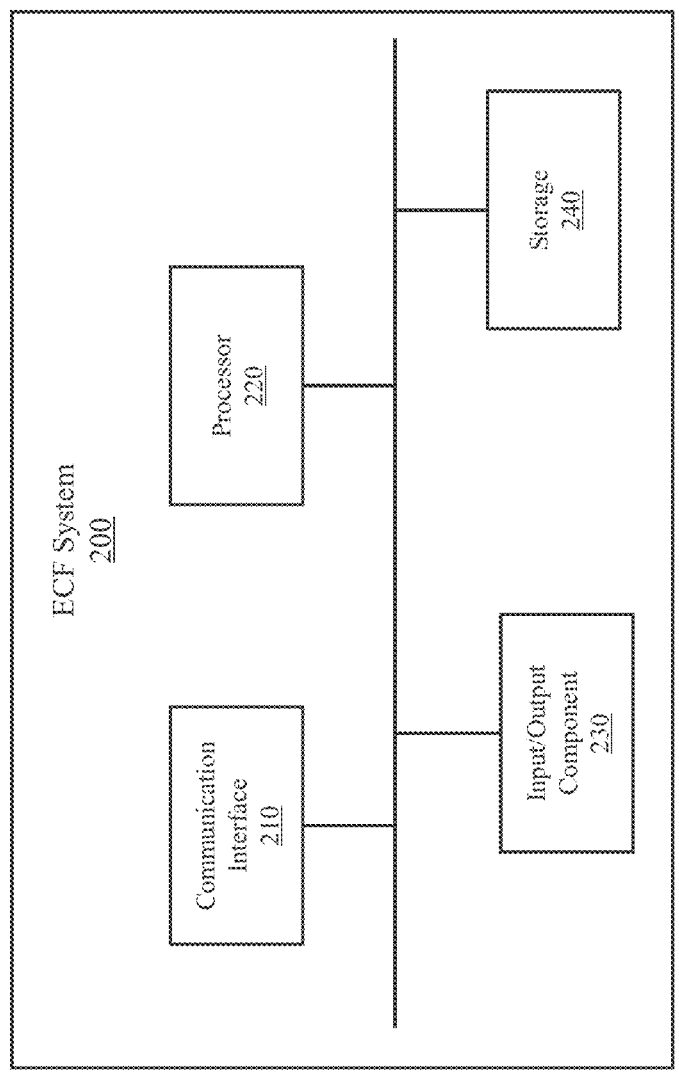
FIG. 2 illustrates a block diagram of example components in an ECF system, according to one or more embodiments.

FIG. 2 illustrates a block diagram of example components in a ECF system 200, according to one or more embodiments. The ECF system 200 may corresponds to the ECF system 120 in FIG. 1, thus the features associated with the ECF system 120 and the ECF system 200 may be similarly applicable to each other, unless being explicitly described otherwise.

As illustrated in FIG. 2, the ECF system 200 may include at least one communication interface 210, at least one processor 220, at least one input/output component 230, and at least one storage 240, although it can be understood that the ECF system 200 may include more or fewer components than as illustrated in FIG. 2, and/or may be arranged in a manner different from as illustrated in FIG. 2, without departing from the scope of the present disclosure.

The communication interface 210 may include at least one transceiver-like component (e.g., a transceiver, a separate receiver and transmitter, a bus, etc.) that enables the components of the ECF system 200 to communicate with each other and/or to communicate with one or more components external to the ECF system 200, such as via a wired connection, a wireless connection, or a combination of wired and wireless connections.

For instance, the communication interlace 210 may couple the processor 220 to the storage 240 to thereby enable them to communicate and to intemperate with each other in performing one or more operations. As another example, communication interface 210 may couple the ECF system 200 (or one or more components included therein) to the E2 Node 110 and the E2 Termination Instance 130, so as to enable them to communicate and to interoperate with each other.

According to one or more embodiments, the communication interface 210 may include one or more application programming interfaces (APIs) which allow the ECF system 200 (or one or more components included therein) to communicate with one or more software applications.

The input/output component 230 may include at least one component that permits the ECF system 200 to receive information and/or to provide output information. It can be understood that, in some embodiments, the input/output component 230 may include at least one input component (e.g., a touch screen display, a button, a switch, a microphone, a sensor, etc.) and at least one output component (e.g., a display, a speaker, one or more light-emitting diodes (LEDs), etc.), each of which may be separated from each other.

The storage 240 may include one or more storage mediums suitable for storing data, information, and/or computer-executable instructions therein. According to embodiments, the storage 240 may include at least one memory storage, such as a random access memory (RAM), a read only memory (ROM), and/or another type of dynamic or static storage device (e.g., a flash memory, a magnetic memory, and/or an optical memory) that stores information and/or instructions for use by the processor 220. Additionally or alternatively, the storage 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

According to embodiments, the storage 240 may be configured to store information, such as raw data, metadata, or the like. Additionally or alternatively, the storage 240 may be configured to store one or more information associated with one or more operations performed by the processor 220. For instance, the storage 240 may store information defining the historical operation(s) performed by the processor 220 to forward E2 communication, one or more results of operations performed by the processor 220, or the like. Further, the storage 240 may store data or information required in forwarding E2 communication. For instance, the storage 240 may store at least one mapping table (described below with reference to FIG. 7 and FIG. 8).

In some implementations, the storage 240 may include a plurality of storage mediums, and the storage 240 may be configured to store a duplicate or a copy of at least a portion of the information in the plurality of storage mediums, for providing redundancy and for backing-up the information or the associated data. Furthermore, the storage 240 may also store computer-readable or computer-executable instructions which, when being executed by one or more processors (e.g., processor 220), causes the one or more processors to perform one or more actions/operations described herein.

The processor 220 may include at least one processor capable of being programmed or being configured to perform a function(s) or an operation(s) described herein. For instance, the processor 220 may be configured to execute computer-executable instructions stored in at least one storage medium or a memory storage (e.g. storage 240, etc.) to thereby perform one or more actions or one or more operations described herein.

According to embodiments, the processor 220 may be configured to receive (e.g., via the communication interface 210, via the input/output component 230, etc.) one or more signals and/or one or more user inputs defining one or more instructions for performing one or more operations. Further, the processor 220 may be implemented in hardware, firmware, or a combination of hardware and software. For instance, processor 220 may include at least one of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing or computing component.

According to embodiments, the processor 220 may be configured to collect, to extract, and/or to receive one or more information (in the form of signal or data, etc.), and to process the received one or more information to thereby forward E2 communication.

Descriptions of several example operations which may be performed by the processor 220 are provided below with reference to FIG. 6 to FIG. 10.

Figure 3:
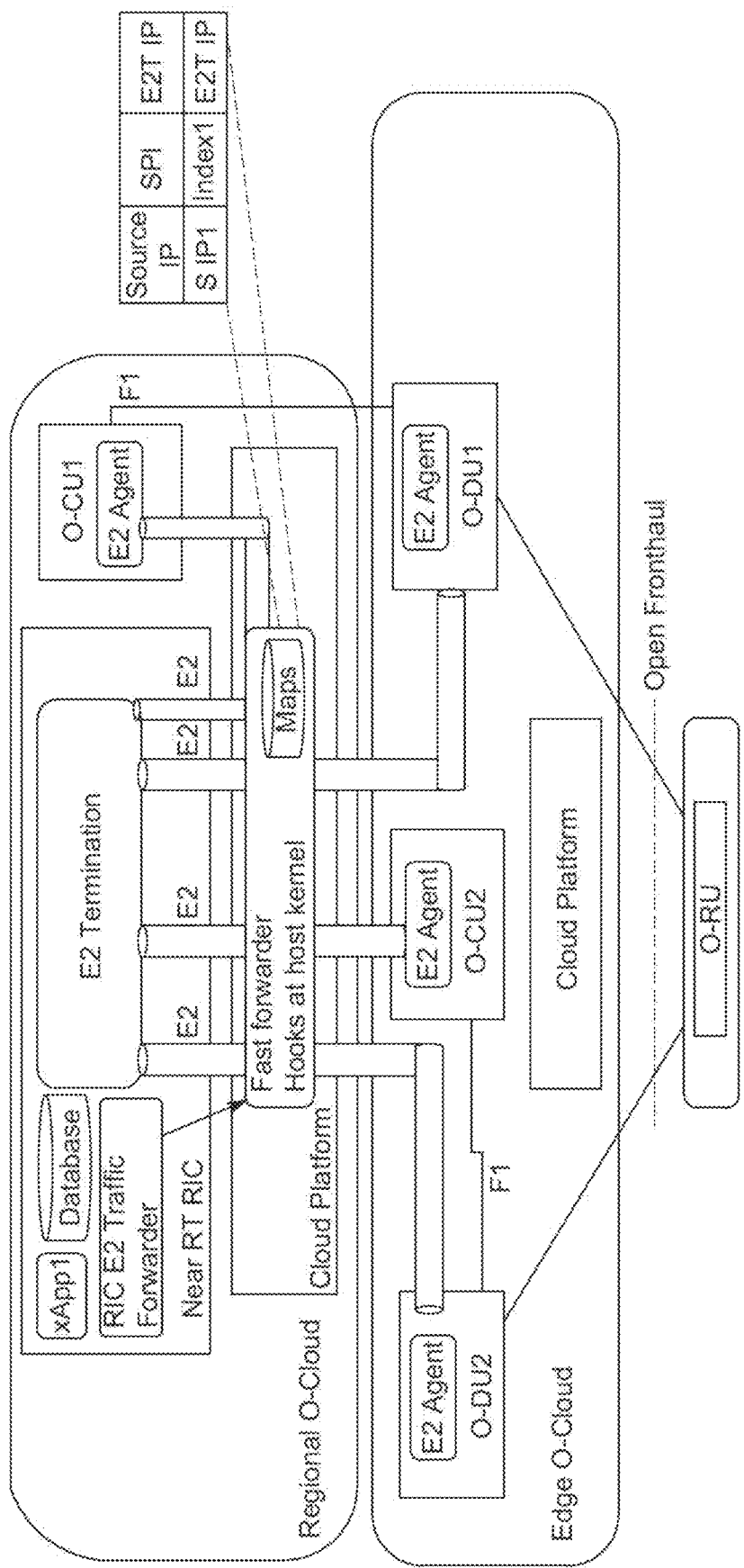
FIG. 3 illustrates a first example of deployment configuration for the ECF system, according to one or more embodiments.

FIG. 3 illustrates a first example of deployment configuration for the ECF system, according to one or more embodiments. As shown in FIG. 3, four E2 interfaces with IPSec tunnels may be deployed for communication between an E2 Termination Instance at the Near-RT RIC and E2 Nodes (O-DU1, O-DU2, O-CU1, and O-CU2). As also shown in FIG. 3, some E2 Nodes may be deployed at a Regional O-Cloud where the Near-RT RIC is deployed (i.e., O-CU1), and some E2 Nodes may be deployed at an Edge O-Cloud (i.e., O-DU1, O-DU2, and O-CU2.

It can be understood that the configuration illustrated in FIG. 3 is simplified for descriptive purpose, and is not intended to limit the scope of the present disclosure in any way. For example, the number of E2 interfaces, the number of E2 Nodes, the number of E2 Termination Instance, and specific deployment location of the E2 Nodes can be any.

Figure 4:
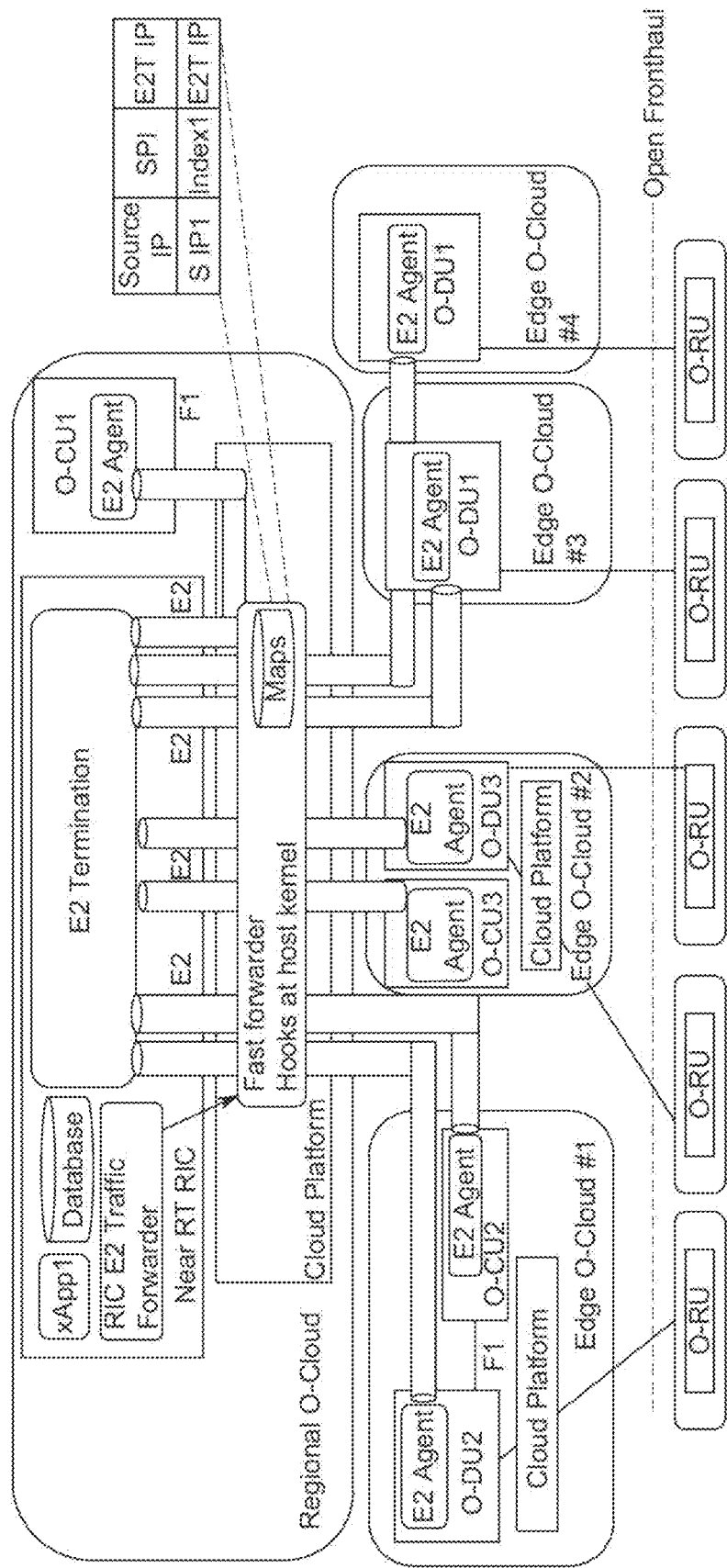
FIG. 4 illustrates a second example of deployment configuration for the ECF system, according to one or more embodiments.

FIG. 4 illustrates a second example of deployment configuration for the ECF system, according to one or more embodiments. As shown in FIG. 4, seven E2 interfaces with IPSec tunnels may be deployed for communication between an E2 Termination Instance at the Near-RT RIC and E2 Nodes. Further, E2 Nodes may be deployed at different O-Clouds: O-CU1 may be deployed at the Regional O-Cloud; O-DU2 and O-CU2 may be deployed at Edge O-Cloud 1; O-DU3 and O-CU3 may be deployed at Edge O-Cloud 2; one O-DU1 may be deployed at Edge O-Cloud 3; and one O-DU1 may be deployed at Edge O-Cloud 4.

Figure 5:
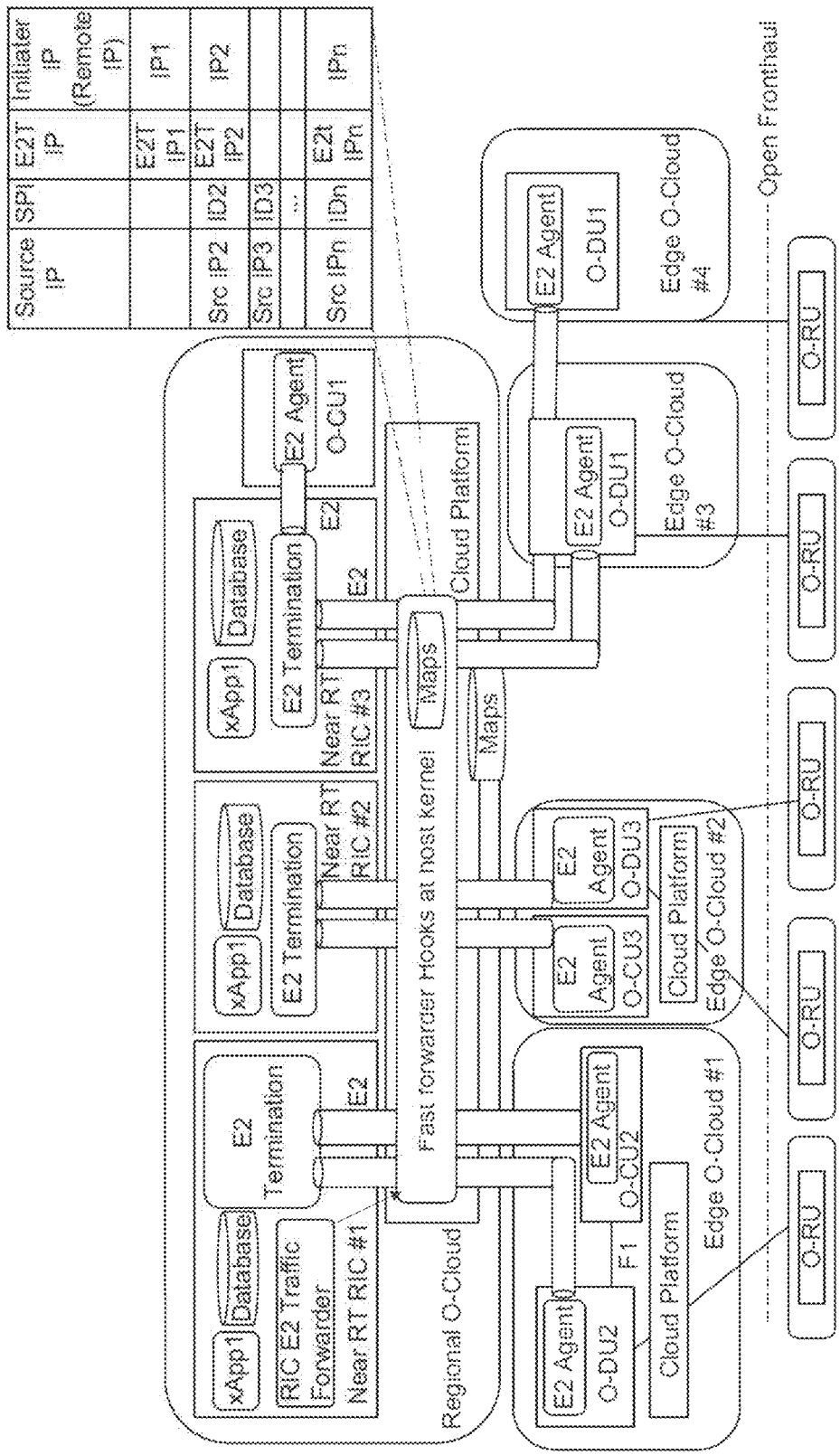
FIG. 5 illustrates a third example of deployment configuration for the ECF system, according to one or more embodiments.

FIG. 5 illustrates a third example of deployment configuration for the ECF system, according to one or more embodiments. As shown in FIG. 5, seven E2 interfaces with IPSec tunnels may be deployed for communication between three E2 Termination Instances at three Near-RT RICs and E2 Nodes. Further, E2 Nodes may be deployed at different O-Clouds and communicating with one of the E2 Termination Instances: O-CU1 may be deployed at the Regional O-Cloud and communicating with the E2 Termination Instance at Near-RT RIC3; O-DU2 and O-CU2 may be deployed at Edge O-Cloud 1 and communicating with the E2 Termination Instance at Near-RT RIC1; O-DU3 and O-CU3 may be deployed at Edge O-Cloud 2 and communicating with the E2 Termination Instance at Near-RT RIC2; one O-DU1 may be deployed at Edge O-Cloud 3 and communicating with the E2 Termination Instance at Near-RT RIC3; and one O-DU1 may be deployed at Edge O-Cloud 4 and communicating with the E2 Termination Instance at Near-RT RIC3.

Example Operations for Forwarding E2 Communication in the Present Disclosure

In the following, several example operations performable by the ECF system of the present disclosure are described with reference to FIG. 6 to FIG. 10.

Figure 6:
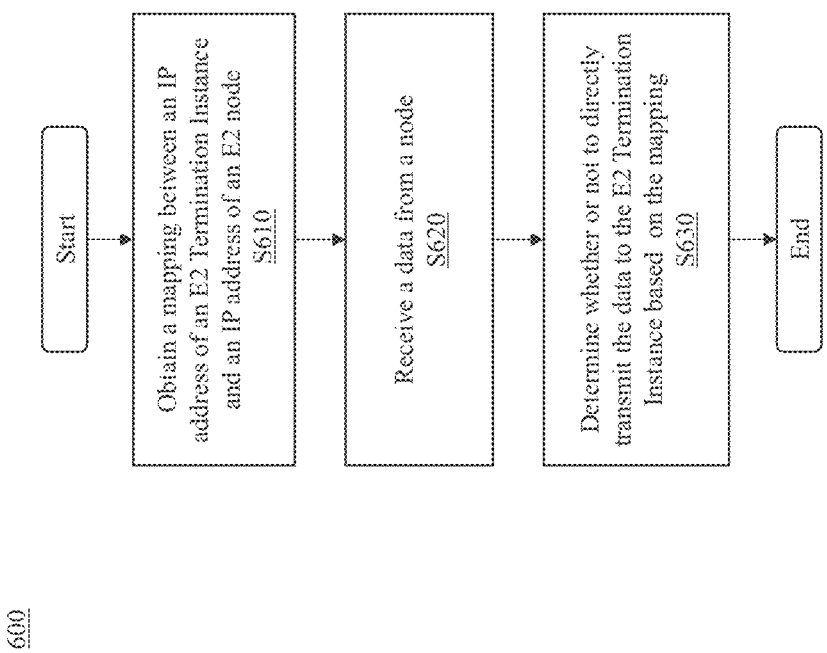
FIG. 6 illustrates a flow diagram of an example method for forwarding E2 communication, according to one or more embodiments.

FIG. 6 illustrates a flow diagram of an example method 600 for forwarding E2 communication, according to one or more embodiments. One or more operations in method 600 may be performed by at least one processor (e.g., processor 220) of the ECF system.

As illustrated in FIG. 6, at operation S610, the at least one processor may be configured to obtain (e.g., create, update, and/or obtain a previously created mapping) a mapping between an IP address of an E2 Termination Instance and an IP address of an E2 Node that is associated with such E2 Termination Instance. The association between the E2 Node and the E2 Termination Instance may be predefined at the time when the E2 Termination Instance is deployed. Examples of operations for obtaining the mapping (or mapping table) are described below with reference to FIG. 7 and FIG. 8.

At operation S620, the at least one processor may be configured to receive a data from a node. Such node may be an E2 node, and such data may include data subjected to Internet Protocol Security (IPSec) under the O-RAN WG11 Security specification, which is to be transmitted to the E2 Termination Instance.

At operation S630, the at least one processor may be configured to determine whether to directly transmit (forward) the data to the E2 Termination Instance based on the mapping created at operation S610. Examples of operations for determining whether to directly transmit the data are described below with reference to FIG. 9.

Upon performing operation S630, the method 600 may be ended or be terminated. Alternatively, method 600 may return to operation S610, such that the at least one processor may be configured to repeatedly perform, for at least a predetermined amount of time, the receiving the data (at operation S620), and the determining whether to directly transmit the data (at operation S630). For instance, the at least one processor may continuously (or periodically) receive data, and then restart the determining whether to directly transmit the data; where the method 600 may be ended when the at least one processor receives a notification that the last E2 Termination Instance at the Near-RT RIC is no longer being deployed at the Near-RT RIC (i.e., when there are no E2 Termination Instance left that is being deployed at the Near-RT RIC).

To this end, the system of the present disclosure may forward E2 communication from an E2 Node to an E2 Termination Instance based on a mapping between an IP address of the E2 Termination Instance and an IP address of the E2 Node.

Example Operations for Obtaining a Mapping in the Present Disclosure

In the following several example operations performable by the at least one processor for obtaining a mapping are described with reference to FIG. 7 and FIG. 8.

Figure 7:
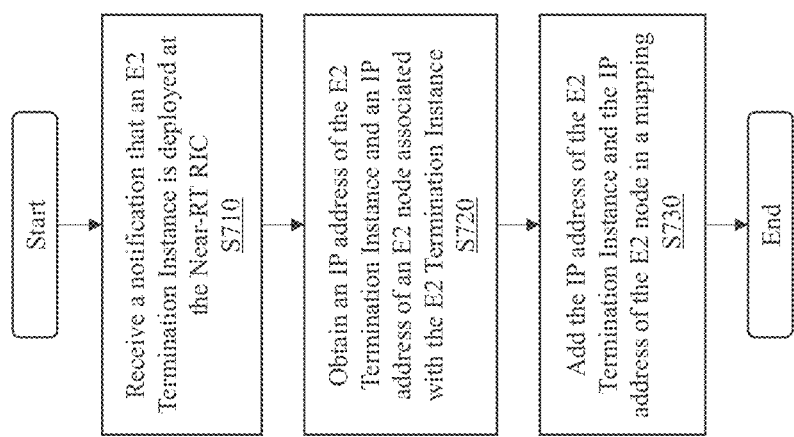
FIG. 7 illustrates a flow diagram of an example method for obtaining a mapping, according to one or more embodiments.

FIG. 7 illustrates a flow diagram of an example method 700 for obtaining a mapping (or mapping table), according to one or more embodiments. One or more operations of method 700 may be part of operation S610 in method 600, and may be performed by at least one processor (e.g., processor 220) of the ECF system.

As illustrated in FIG. 7, at operation S710, the at least one processor may be configured to receive a notification that an E2 Termination Instance is deployed at the Near-RI RIC. The method may then proceed to operation S720.

At operation S720, the at least one processor may be configured to obtain an IP address of the E2 Termination Instance indicated in the notification as well as an IP address of an E2 Node that is associated with such E2 Termination Instance. Such IP address of the E2 Node may be a remote IP address.

For example, referring back to FIG. 3, the at least one processor may be configured to obtain an IP address of the E2 Termination Instance that is deployed at the Near-RT RIC as well as an IP address of O-CU1, O-CU2, O-DU1, and O-DU2 that are associated with such E2 Termination Instance. As another example, referring back to FIG. 5, the at least one processor may be configured to obtain an IP address of the E2 Termination Instance that is deployed at the Near-RT RIC1, an IP address of the E2 Termination Instance that is deployed at the Near-RT RIC2, and an IP address of the E2 Termination Instance that is deployed at the Near-RT RIC3, as well as an IP address of O-CU1 that is associated with the E2 Termination Instance at Near-RT RIC3; O-DU2 and O-CU2 that are associated with the E2 Termination Instance at Near-RT RIC1: O-DU3 and O-CU3 that are associated with the E2 Termination Instance at Near-RT RIC2; one O-DU1 that is associated with the E2 Termination Instance at Near-RT RIC3; and one O-DU1 that is associated with the E2 Termination Instance at Near-RT RIC3. The method may then proceed to operation S730.

At operation S730, the at least one processor may be configured to add the IP address of the E2 Termination Instance and the IP address of the E2 Node that is associated with such E2 Termination Instance indicated in the notification in a mapping.

For example, referring back to FIG. 3, the at least one processor may be configured to add the IP address of the E2 Termination Instance that is deployed at the Near-RT RIC and the IP address of O-CU1, O-CU2, O-DU1, and O-DU2 that are associated with such E2 Termination Instance in the mapping. As another example, referring back to FIG. 5, the at least one processor may be configured to add the IP address of the E2 Termination Instance that is deployed at the Near-RI RIC1 and the IP address of O-DU2 and O-CU2 that are associated with the E2 Termination Instance at Near-RT RIC1; the IP address of the E2 Termination Instance that is deployed at the Near-RT RIC2 and the IP address of O-DU3 and O-CU3 that are associated with the E2 Termination Instance at Near-RT RIC2; and the IP address of the E2 Termination Instance that is deployed at the Near-RT RIC3 and the IP address of O-CU1 and two O-DU1 that are associated with the E2 Termination Instance at Near-RT RIC3 in the mapping.

Figure 8:
FIG. 8 illustrates an example of a mapping, according to one or more embodiments.

FIG. 8 illustrates an example of a mapping (e.g., mapping table), according to one or more embodiments.

As shown in FIG. 8, the mapping may be in the form of a table, and may include columns for Source IP Address, Initiator Security Parameter Index (SPI), IP address for the E2 Termination Instance, and IP address for the E2 Node that is associated with the E2 Termination Instance (i.e., remote IP address). At operation S730, for example, the at least one processor may be configured to add the IP address of the E2 Termination Instance and the IP address of the E2 Node as E2 Termination Instance IP Address 1, E2 Termination Instance IP Address 2, Remote IP Address 1, and Remote IP Address 2, as shown in FIG. 8. Accordingly, the mapping may specify the association between the IP address of the E2 Termination Instance and the IP address of the E2 Node.

It can be understood that the configuration illustrated in FIG. 8 is for descriptive purpose, and is not intended to limit the scope of the present disclosure in any way. For example, the number of rows in the table can be any number, and the table can include any additional columns as required. According to certain embodiments, the mapping may also be in other forms, such as a list including only the IP address of the E2 Termination Instance(s), where it can be assumed that the Source IP Address would correspond to the Remote IP Address. Details regarding the Source IP address and SPI will be discussed below in relation to FIG. 9.

According to one or more embodiments, the above operations S710, S720, and S730 may be performed by the E2 traffic forwarder module in the ECF system. Further, the mapping may include a generic storage type for sharing data between kernel and user space, such that the mapping can be accessed by the hook module.

Example Operations for Determining Whether to Directly Transmit the Data in the Present Disclosure In the following several example operations performable by the at least one processor for determining whether to directly transmit the data are described with reference to FIG. 9.

Figure 9:
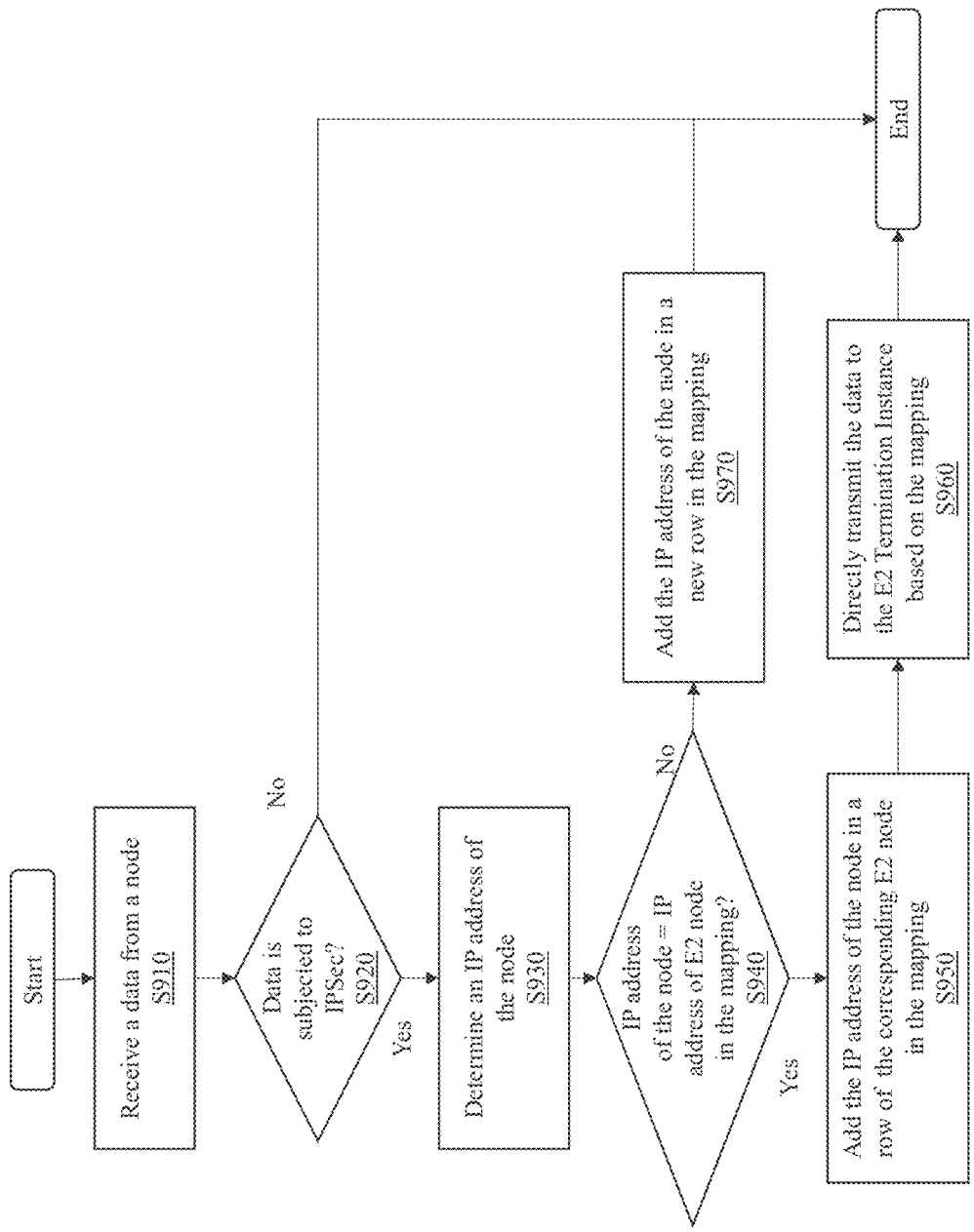
FIG. 9 illustrates a flow diagram of an example method for determining whether to directly transmit the data, according to one or more embodiments.

FIG. 9 illustrates a flow diagram of an example method 900 for determining whether to directly transmit the data, according to one or more embodiments. One or more operations of method 900 may be part of operations S620 and S630 in method 600, and may be performed by at least one processor (e.g., processor 220) of the ECF system.

As illustrated in FIG. 9, at operation S910, the at least one processor may be configured to receive data from a node. Such node may be an E2 node. The method may then proceed to operation S920.

At operation S920, the at least one processor may be configured to determine whether or not the data needs to be forwarded, by determining whether or not the data is subjected to IPSec. According to embodiments, the at least one processor may also be configured to determine whether the data IPSec traffics with protocol type ISAKMP (IKE_SA_INIT, IKE_AUTH, INFORMATIONAL) or AH/ESP.

Accordingly, based on determining that the data is subjected to IPSec, the at least one processor may determine that the data needs to be forwarded, and the method proceeds to operation S930. On the other hand, based on determining that the data is not subjected to IPSec, the at least one processor may determine that the data does not need to be forwarded, and the method proceeds to end.

At operation S930, the at least one processor may be configured to determine an IP address of the node that transmitted the data. Such IP address of the node may include a source IP address of the data. According to one or more embodiments, the at least one processor may be configured to also determine an Initiator Security Parameter Index (SPI) of the data. The method may then proceed to operation S940.

At operation S940, the at least one processor may be configured to determine whether or not the IP address of the node that transmitted the data corresponds to any one of the IP addresses of the E2 Node in the mapping (i.e., the mapping obtained in method 700).

Accordingly, based on determining that the IP address of the node that transmitted the data corresponds to one of the IP addresses of the E2 Node in the mapping, the method proceeds to operation S950. On the other hand, based on determining that the IP address of the node that transmitted the data does not correspond to any one of the IP addresses of the E2 Node in the mapping, the method proceeds to operation S970.

At operation S950, the at least one processor may be configured to add the IP address of the node in a row of the corresponding E2 node in the mapping. According to one or more embodiments, the at least one processor may be configured to also add the SPI of the data in the same row of the corresponding E2 node in the mapping.

For example, referring back to FIG. 8, if the at least one processor determine that the IP address of the node that transmitted the data (e.g., Source IP Address 1) corresponds to the E2 Node Remote IP Address 1 in the mapping, the at least one processor may be configured to add Source IP Address 1 in the same row as the Remote IP Address 1. Similarly, the at least one processor may be configured to add the SPI of the data (e.g., Index 1) in the same row as the Remote IP Address 1. It may be understood that the IP address of the node and SPI may be added in any other manner, as long as the relationship and correspondence between the IP address of the node, SPI, IP address of the E2 Termination Instance, and IP address of the E2 Node is specified.

At operation S970, the at least one processor may be configured to add the IP address of the node in a new row in the mapping. According to one or more embodiments, the at least one processor may be configured to also add the SPI of the data in the same row as the IP address of the node.

For example, referring back to FIG. 8, if the at least one processor determines that the IP address of the node that transmitted the data (e.g., Source P Address 3) does not correspond to any of the Remote IP Addresses in the mapping, the at least one processor may be configured to add Source IP Address 3 in the new row (i.e., the row that does not have any E2 Termination Instance IP Address/Remote IP Address). Similarly, the at least one processor may be configured to add the SPI of the data (e.g., Index 3) in the same row as Source IP Address 3. The method may then proceed to end.

The above operation accommodates for a situation where an E2 Node transmits a data to a certain E2 Termination Instance, but that certain E2 Termination Instance is not yet deployed or there is some kind of issue that causes that certain E2 Termination Instance to fail to be added to the mapping. Subsequently, the system may not be able to identify that certain E2 Termination Instance (as well as the associated E2 Node) in the mapping, and cannot transmit the data to that certain E2 Termination Instance. The above operation will allow for the transmission of such data to be recorded and the data may be held until that certain E2 Termination Instance is deployed or added to the mapping.

At operation S960, the at least one processor may be configured to directly transmit the data to the E2 Termination Instance based on the mapping. For example, referring back to FIG. 5, if the at least one processor determines that the IP address of the node that transmitted the data corresponds to the IP address of O-DU2 in the mapping (e.g., the Source IP Address 1 corresponds to Remote IP address 1 of O-DU2 in FIG. 8), the at least one processor may be configured to directly transmit the data to the E2 Termination Instance that is deployed at the Near-RT RIC1 (i.e., based on the mapping between the IP address of the E2 Termination Instance that is deployed at the Near-RT RIC1 and the IP address of O-DU2). The method may then proceed to end.

According to one or more embodiments, after operation S930 and before operation S940, the at least one processor may be configured to additionally determine whether or not the IP address of the node that transmitted the data is already in the mapping. Accordingly, based on determining that the IP address of the node that transmitted the data is already in the mapping, the method may skip operations S940 and S950 and proceeds to operation S960 to directly transmit the data based on the mapping. On the other hand, based on determining that the IP address of the node that transmitted the data is not already in the mapping, the method may proceed to operation S940 in a similar manner as explained above.

According to one or more embodiments where there is only one E2 Termination Instance, the at least one processor may be configured to obtain only the IP address of the E2 Termination Instance indicated in the notification without the IP address of the E2 Node that is associated with such E2 Termination Instance at operation S720 of method 700, and add only the IP address of the E2 Termination Instance in the mapping at operation S730 of method 700. In such case, method 900 may assume that the IP address of the node that transmitted the data corresponds to the IP address of the E2 Node that is associated with the E2 Termination Instance. Accordingly, the method 900 may skip operation S940, and proceed to operation S950 after operation S930.

According to one or more embodiments, the above operations S950 and S970 may be performed by the E2 traffic forwarder module in the ECF system, and the above operations S910, S920, S930, S940, and S960 may be performed by the hook module in the ECF system. In particular, the hook module may contain a parsing logic to read the source IP address, the SPI from IKEv2 Phase 1 and 2, and the encapsulated AH/ESP packets received on a specific NIC interface in the host. Further, the hook module may receive a packet (data) as early as possible and deliver such packet directly into network namespace of the E2 Termination Instance (i.e., at operation S960). This allows the system to bypass one or more security elements, such as iptables and Linux stack in a host namespace as well as an overhead in a container namespace. In other words, the system could directly transmit the data to E2 Termination Instance.

Subsequently, the latency for communication through the E2 interface may be reduced and ensured to satisfy the requirement for the Near-RT RIC of between 10 milliseconds and 1 second even when IPSec is implemented on the E2 interface. In particular, the above improve the performance and achieve the latency requirements for some of the Near-RT RIC xApp supported use cases that is required to be in the range of 10 milliseconds and 1 second latency to complete RIC Control operations towards E2 Nodes over E2 interface when the interface that is enabled with IPSec.

Referring to the example shown in FIG. 8, for example, an instance of E2 Termination is deployed first, and the IP address of the instance of E2 Termination and the IP address of the E2 node associated with such instance of E2 Termination (i.e., E2 Termination Instance IP Address 1 and Remote IP Address 1) is added to the mapping table (i.e., method 700). Then, a first IPSec packet (i.e., data) is received from the above E2 node. Source IP address and SPI of the packet (i.e., Source IP Address 1 and Index 1) is obtained and added into the mapping table, and the packet is forwarded directly to the instance of E2 Termination.

Similarly, another instance of E2 Termination is deployed, and the IP address of the instance of E2 Termination and the IP address of the E2 node associated with such instance of E2 Termination (i.e., E2 Termination Instance IP Address 2 and Remote IP Address 2) is added to the mapping table (i.e., method 700). However, no packet is received from the above E2 node, and thus, the entry for Source IP address and SPI for the row associated, with E2 Termination Instance IP Address 2 and Remote IP Address 2 is empty.

Further, a packet is received from one of the E2 node and the Source IP address and SPI of the packet (i.e., Source IP Address 3 and Index 3) is obtained. However, an instance of E2 Termination associated with such E2 node is not yet deployed. Thus, the Source IP address and SPI of the packet are added to a new row in the mapping, where the entry for the IP address of the instance of E2 Termination and E2 node is empty. These entries may be updated and added when the above instance of E2 Termination is deployed in the Near-RT RIC.

Figure 10B:
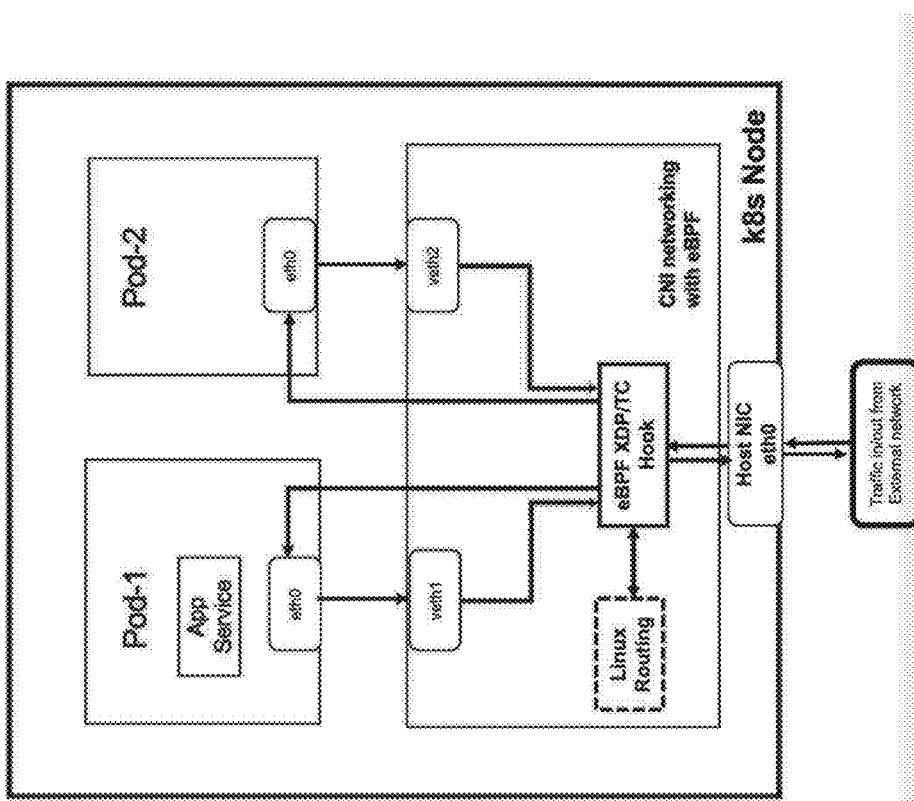
FIG. 10B illustrates a container networking packet flow according to one or more embodiments.
Figure 10A:
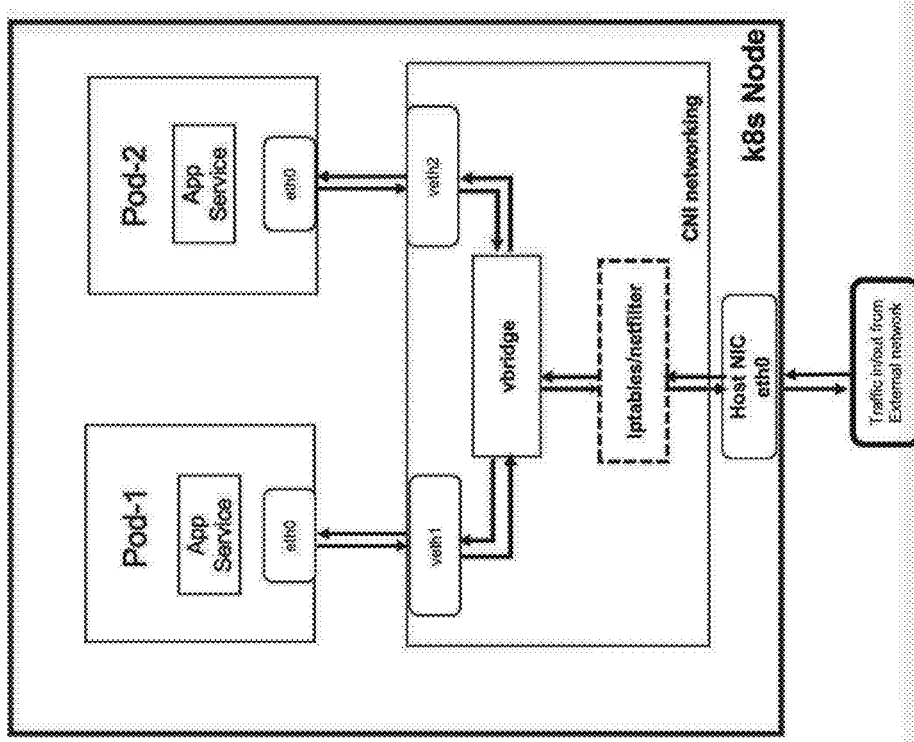
FIG. 10A illustrates a standard container networking packet flow in the related art.

FIG. 10A and FIG. 10B illustrate a comparison between a standard container networking packet (data) flow in the related art (FIG. 10A) and a container networking packet (data) flow according to one or more embodiments (FIG. JOB).

As shown in FIG. 10A, when the packet is transmitted from an external network to the Pods (ingress traffic), the packet first enters the k8s Node through the Host NIC eth0, which must then pass through the iptables/netfilters, vbridge and veth before arriving at the eth0 of each Pods (Pod-1 and Pod 2). The reverse applies when the packet is transmitted from the Pods to the external network (egress traffic).

On the other hand, as shown in FIG. 10B, the method for forwarding E2 communication according to one or more embodiments allows the eBPF XDP/TC Hook (i.e., hook module) to pick up the packet alter the packet enters into the Network Interface, bypass the vbridge and veth, and directly transmit the packet to the eth0 of each Pods for ingress traffic. For egress traffic, the packet would still pass through the veth, be picked up by the eBPF XDP/TC Hook, and then be directly transmitted to the Network Interface. Such bypassing of the iptables/netfilters, vbridge and veth improves the latency as pointed out above.

Example Implementation Environment

Figure 11:
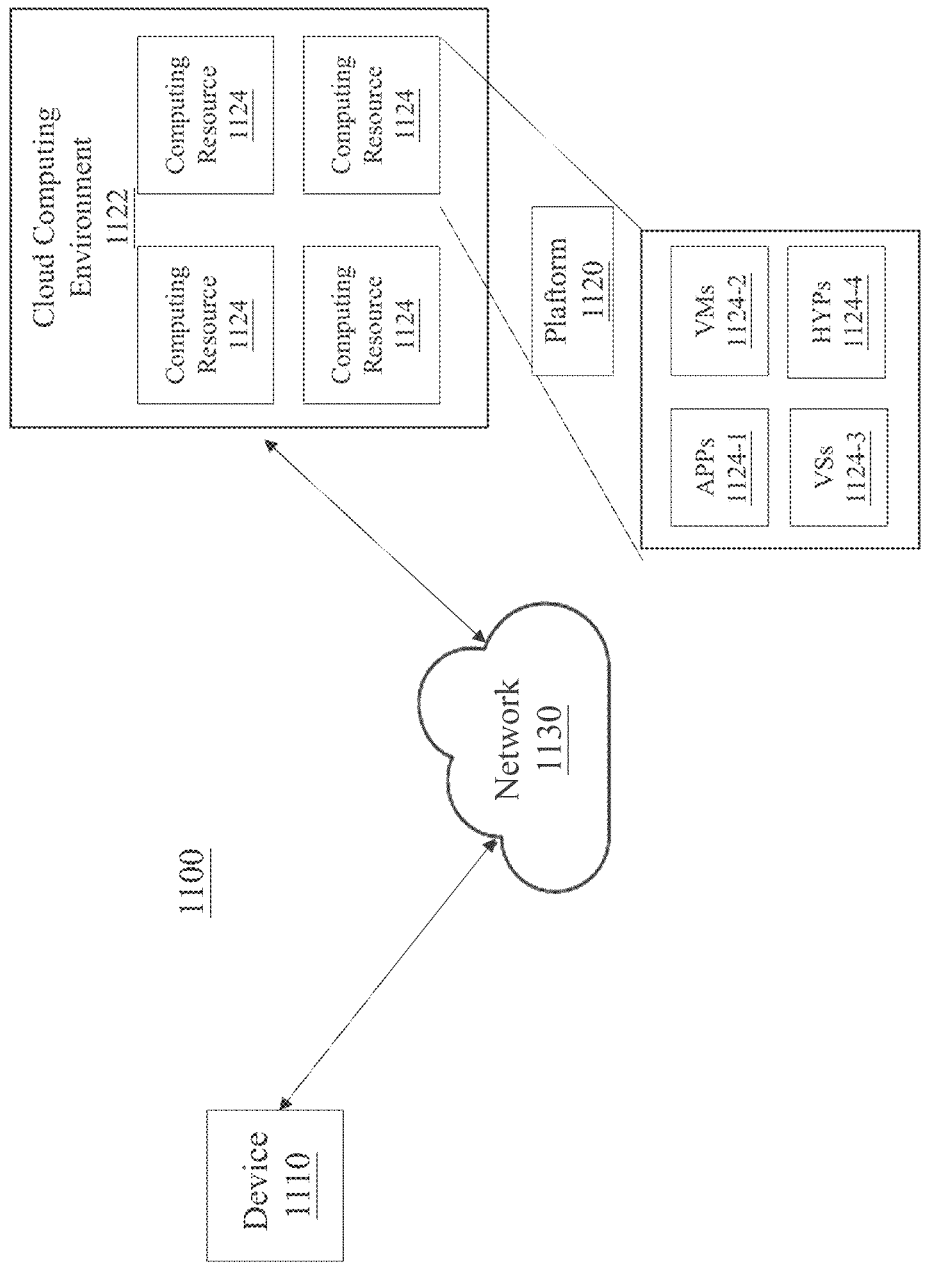
FIG. 11 illustrates a diagram of an example environment in which systems and/or methods, described herein, may be implemented.

FIG. 11 illustrates a diagram of an example environment 1100 in which systems and/or methods, described herein, may be implemented. As shown in FIG. 11, environment 1100 may include a device 1110, a platform 1120, and a network 1130. Devices of environment 1100 may interconnect via wired connections, wireless connections, or a combination of wired and wireless connections. In some embodiments, any of the functions and operations described with reference to FIG. 1 to FIG. 10 above may be performed by any combination of elements illustrated in FIG. 11.

According to embodiments, the ECF system described herein may be stored, hosted, or deployed in the cloud computing platform 1120. In this regard, device 1110 may include a device, system, equipment, or the like, utilized by the user (e.g., user of a marketing team, user of a network planning team, etc.) to access the ECF system. In that case, device 1110 may include one or more devices capable of receiving, generating, storing, processing, and/or providing information associated with platform 1120.

Platform 1120 includes one or more devices capable of receiving, generating, storing, processing, and/or providing information. In some implementations, platform 1120 may include a cloud server or a group of cloud servers. In some implementations, platform 1120 may be designed to be modular such that certain software components may be swapped in or out depending on a particular need. As such, platform 1120 may be easily and/or quickly reconfigured for different uses.

In some implementations, as shown, platform 1120 may be hosted in cloud computing environment 1122. Notably, while implementations described herein describe platform 1120 as being hosted in cloud computing environment 1122, in some implementations, platform 1120 may not be cloud-based (i.e., may be implemented outside of a cloud computing environment) or may be partially cloud-based.

Cloud computing environment 1122 includes an environment that hosts platform 1120. Cloud computing environment 1122 may provide computation, software, data access, storage, etc. services that do not require end-user (e.g., user device 1110) knowledge of a physical location and configuration of system(s) and/or device(s) that hosts platform 1120. As shown, cloud computing environment 1122 may include a group of computing resources 1124 (referred to collectively as "computing resources 1124" and individually as "computing resource 1124").

Computing resource 1124 includes one or more personal computers, a cluster of computing devices, workstation computers, server devices, or other types of computation and/or communication devices. In some implementations, computing resource 1124 may host platform 1120. The cloud resources may include compute instances executing in computing resource 1124, storage devices provided in computing resource 1124, data transfer devices provided by computing resource 1124, etc. In some implementations, computing resource 1124 may communicate with other computing resources 1124 via wired connections, wireless connections, or a combination of wired and wireless connections.

As further shown in FIG. 11, computing resource 1124 includes a group of cloud resources, such as one or more applications ("APPs") 1124-1, one or more virtual machines ("VMs") 1124-2, virtualized storage ("VSs") 1124-3, one or more hypervisors ("HYPs") 1124-4, or the like. While the current example embodiment is with reference to virtualized network functions, it is understood that one or more other embodiments are not limited thereto, and may be implemented in at least one of containers, cloud-native services, one or more container platforms, etc. For example, in one or more other example embodiments, any of the above-described components (e.g., nodes, E2 nodes, SMO functions, RIC, system, apparatus, etc.) may be a software-based component deployed or hosted in, for example, a server cluster such as a hybrid cloud server, data center servers, and the like. The software-based component may be containerized and may be deployed and controlled by one or more machines, called "nodes", that run or execute the containerized network elements. In this regard, a server cluster may contain at least one master node and a plurality of worker nodes, wherein the master node(s) controls and manages a set of associated worker nodes.

Referring back to FIG. 11, Application 1124-1 includes one or more software applications that may be provided to or accessed by user device 1110. Application 1124-1 may eliminate a need to install and execute the software applications on user device 1110. For example, application 1124-1 may include software associated with platform 1120 and/or any other software capable of being provided via cloud computing environment 1122, in some implementations, one application 1124-1 may send/receive information to/from one or more other applications 1124-1, via virtual machine 1124-2.

Virtual machine 1124-2 includes a software implementation of a machine (e.g., a computer) that executes programs like a physical machine. Virtual machine 1124-2 may be either a system virtual machine or a process virtual machine, depending upon use and degree of correspondence to any real machine by virtual machine 1124-2. A system virtual machine may provide a complete system platform that supports execution of a complete operating system ("OS"). A process virtual machine may execute a single program, and may support a single process, in some implementations, virtual machine 1124-2 may execute on behalf of a user (e.g., user device 1110), and may manage infrastructure of cloud computing environment 1122, such as data management, synchronization, or long-duration data transfers.

Virtualized storage 1124-3 includes one or more storage systems and/or one or more devices that use virtualization techniques within the storage systems or devices of computing resource 1124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 1124-4 may provide hardware virtualization techniques that allow multiple operating systems (e.g., "guest operating systems") to execute concurrently on a host computer, such as computing resource 1124. Hypervisor 1124-4 may present a virtual operating platform to the guest operating systems, and may manage the execution of the guest operating systems. Multiple instances of a variety of operating systems may share virtualized hardware resources.

Network 1130 may include one or more wired and/or wireless networks. For example, network 1130 may include a cellular network (e.g., a fifth generation (SG) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoe network, an intranet, the Internet, a fiber optic-based network, or the like, and/or a combination of these or other types of networks.

The number and arrangement of devices and networks shown in FIG. 11 are provided as an example. In practice, there may be additional devices and/or networks, fewer devices and/or networks, different devices and/or networks, or differently arranged devices and/or networks than those shown in FIG. 11. Furthermore, two or more devices shown in FIG. 11 may be implemented within a single device, or a single device shown in FIG. 11 may be implemented as multiple, distributed devices. Additionally, or alternatively, a set of devices (e.g., one or more devices) of environment 1100 may perform one or more functions described as being performed by another set of devices of environment 1100.

VARIOUS ASPECTS OF EMBODIMENTS

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing; processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data k r integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions-acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s) module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Various further respective aspects and features of embodiments of the present disclosure may be defined by the following items:

Item [1]: An apparatus that may be capable of forwarding E2 communication to a near-real-time radio access network (RAN) intelligent controller (Near-RI RIC), and the apparatus may include: at least one memory storage storing computer-executable instructions; and at least one processor communicatively coupled to the at least one memory storage, wherein the at least one processor may be configured to execute the instructions to: obtain a mapping between a first IP address of an instance of E2 Termination deployed at the Near-RT RIC and at least one second IP address of at least one E2 node associated with the instance of E2 Termination; receive a data from an E2 node; determine whether to directly transmit the data to the instance of E2 Termination based on the mapping.

Item [2]: The apparatus according to item [1], wherein the data may be subjected to Internet Protocol Security (IPSec).

Item [3]: The apparatus according to any one of items [1] to [2], wherein the at least one processor may be configured to execute the instructions to determine whether to directly transmit the data by: determining an IP address of the E2 node; determining whether or not the IP address of the E2 node correspond to the IP address from among the at least one second IP address in the mapping; in response to determining that the IP address of the E2 node corresponds to the IP address from among the at least one second IP address in the mapping, directly transmitting the data to the instance of E2 Termination associated with the E2 node based on the mapping.

Item [4]: The apparatus according to any one of items [1] to [3], wherein the at least one processor may be configured to execute the instructions to: receive a notification that the instance of E2 Termination is deployed at the Near-RT RIC; and in response to receiving the notification, obtain the first IP address of the instance of E2 Termination and map the first IP address of the instance of E2 Termination to the at least one second IP address of the at least one E2 node associated with the instance of E2 Termination.

Item [5]: The apparatus according to any one of items [1] to [4], wherein the mapping may include a table specifying the association between the first IP address of the instance of E2 Termination and the at least one second IP address of the at least one E2 node.

Item [6]: The apparatus according to any one of items [1] to [5], wherein the at least one E2 node may include at least one of an O-CU, an O-DU, and an O-eNB.

Item [7]: The apparatus according to any one of items [1] to [6], wherein the at least one processor may be configured to execute the instructions to, based on determining to directly transmit the data, directly transmit the data to the instance of E2 Termination by bypassing one or more security elements.

Item [8]: The apparatus according to any one of items [3] to [7], wherein the at least one processor may be configured to execute the instructions to: in response to determining that the IP address of the E2 node corresponds to the IP address from among the at least one second IP address in the mapping, add the IP address of the E2 node in a row of the corresponding IP address of the at least one second IP address in the mapping; and in response to determining that the IP address of the E2 node does not correspond to any of the at least one second IP address in the mapping, add the IP address of the E2 node in a new row different from the at least one second IP address in the mapping.

Item [9]: A method that may be for forwarding E2 communication to a near-real-time radio access network (RAN) intelligent controller (Near-RI RIC), and the method may include: obtaining a mapping between a first IP address of an instance of E2 Termination deployed at the Near-RT RIC and at least one second IP address of at least one E2 node associated with the instance of E2 Termination; receiving a data from an E2 node; determining whether to directly transmit the data to the instance of E2 Termination based on the mapping.

Item [10]: The method according to item [9], wherein the data may be subjected to Internet Protocol Security (IPSec).

Item [11]: The method according to any one of items [9] to [10], wherein the determining whether to directly transmit the data may include: determining an IP address of the E2 node; determining whether or not the IP address of the E2 node correspond to the P address from among the at least one second IP address in the mapping; in response to determining that the IP address of the E2 node corresponds to the IP address from among the at least one second IP address in the mapping, directly transmitting the data to the instance of E2 Termination associated with the E2 node based on the mapping.

Item [12]: The method according to any one of items [9] to [11], may further include: receiving a notification that the instance of E2 Termination is deployed at the Near-RI RIC; and in response to receiving the notification, obtaining the first IP address of the instance of E2 Termination and mapping the first IP address of the instance of E2 Termination to the at least one second IP address of the at least one E2 node associated with the instance of E2 Termination.

Item [13]: The method according to any one of items [11] to [12], wherein the mapping may include a table specifying the association between the first IP address of the instance of E2 Termination and the at least one second IP address of the at least one E2 node.

Item [14]: The method according to any one of items [9] to [13], wherein the at least one E2 node may include at least one of an O-CU, an O-DU, and an O-eNB.

Item [15]: The method according to any one of items [9] to [14], may further include, based on determining to directly transmit the data, directly transmitting the data to the instance of E2 Termination by bypassing one or more security elements.

Item [16]: The method according to any one of items [11] to [15], may further include: in response to determining that the IP address of the E2 node corresponds to the IP address from among the at least one second IP address in the mapping, adding the IP address of the E2 node in a row of the corresponding IP address of the at least one second IP address in the mapping; and in response to determining that the IP address of the E2 node does not correspond to any of the at least one second IP address in the mapping, adding the IP address of the E2 node in a new row different from the at least one second IP address in the mapping.

Item [17]: A non-transitory computer-readable recording medium that may have recorded thereon instructions executable by at least one processor of a system to cause the at least one processor to perform a method for forwarding E2 communication to a near-real-time radio access network (RAN) intelligent controller (Near-RT RIC), and including: obtaining a mapping between a first IP address of an instance of E2 Termination deployed at the Near-RT RIC and at least one second IP address of at least one E2 node associated with the instance of E2 Termination; receiving a data from an E2 node, determining whether to directly transmit the data to the instance of E2 Termination based on the mapping.

Item [18]: The non-transitory computer-readable recording medium according to item [17], wherein the data may be subjected to Internet Protocol Security (IPSec).

Item [19]: The non-transitory computer-readable recording medium according to any one of items [17] to [18], wherein the determining whether to directly transmit the data may include: determining an IP address of the E2 node; determining whether or not the IP address of the E2 node correspond to the IP address from among the at least one second IP address in the mapping; in response to determining that the IP address of the E2 node corresponds to the IP address from among the at least one second IP address in the mapping, directly transmitting the data to the instance of E2 Termination associated with the E2 node based on the mapping.

Item [20]: The non-transitory computer-readable recording medium according to any one of items [17] to [19], wherein the method may further include, based on determining to directly transmit the data, directly transmitting the data to the instance of E2 Termination by bypassing one or more security elements.

It can be understood that numerous modifications and variations of the present disclosure are possible in light of the above teachings. It will be apparent that within the scope of the appended clauses, the present disclosures may be practiced otherwise than as specifically described herein.

What is claimed is:

1. An apparatus capable of forwarding E2 communication to a near-real-time radio access network (RAN) intelligent controller (Near-RT RIC), the apparatus comprising:
   at least one memory storage storing computer-executable instructions; and
   at least one processor communicatively coupled to the at least one memory storage, wherein the at least one processor is configured to execute the instructions to:
      obtain a mapping between a first IP address of an instance of E2 Termination deployed at the Near-RT RIC and at least one second IP address of at least one E2 node associated with the instance of E2 Termination;
      receive data from an E2 node;

determine whether to directly transmit the data to the instance of E2 Termination based on the mapping.

2. The apparatus according to claim 1, wherein the data is subjected to Internet Protocol Security (IPSec).

3. The apparatus according to claim 1, wherein the at least one processor is configured to execute the instructions to determine whether to directly transmit the data by:
    determining an IP address of the E2 node;
    determining whether or not the IP address of the E2 node corresponds to an IP address from among the at least one second IP address in the mapping;
    in response to determining that the IP address of the E2 node corresponds to the IP address from among the at least one second IP address in the mapping, directly transmitting the data to the instance of E2 Termination associated with the E2 node based on the mapping.

4. The apparatus according to claim 1, wherein the at least one processor is configured to execute the instructions to:
    receive a notification that the instance of E2 Termination is deployed at the Near-RT RIC, and
    in response to receiving the notification, obtain the first IP address of the instance of E2 Termination and map the first IP address of the instance of E2 Termination to the at least one second IP address of the at least one E2 node associated with the instance of E2 Termination.

5. The apparatus according to claim 1, wherein the mapping comprises a table specifying the association between the first IP address of the instance of E2 Termination and the at least one second IP address of the at least one E2 node.

6. The apparatus according to claim 1, wherein the at least one E2 node comprises at least one of an O-CU, an O-DU, and an O-eNB.

7. The apparatus according to claim 1, wherein the at least one processor is configured to execute the instructions to, based on determining to directly transmit the data, directly transmit the data to the instance of E2 Termination by bypassing one or more security elements.

8. The apparatus according to claim 3, wherein the at least one processor is configured to execute the instructions to:
    in response to determining that the IP address of the E2 node corresponds to the IP address from among the at least one second IP address in the mapping, add the IP address of the E2 node in a row of the corresponding IP address of the at least one second IP address in the mapping; and
    in response to determining that the IP address of the E2 node does not correspond to any of the at least one second IP address in the mapping, add the IP address of the E2 node in a new row different from the at least one second IP address in the mapping.

9. A method for forwarding E2 communication to a near-real-time radio access network (RAN) intelligent controller (Near-RT RIC), the method comprising:
    obtaining a mapping between a first IP address of an instance of E2 Termination deployed at the Near-RT RIC and at least one second IP address of at least one E2 node associated with the instance of E2 Termination;
    receiving data from an E2 node;
    determining whether to directly transmit the data to the instance of E2 Termination based on the mapping.

10. The method according to claim 9, wherein the data is subjected to Internet Protocol Security (IPSec).

11. The method according to claim 9, wherein the determining whether to directly transmit the data comprises:

determining an IP address of the E2 node;
    determining whether or not the IP address of the E2 node corresponds to an IP address from among the at least one second IP address in the mapping;
    in response to determining that the IP address of the E2 node corresponds to the IP address from among the at least one second IP address in the mapping, directly transmitting the data to the instance of E2 Termination associated with the E2 node based on the mapping.

12. The method according to claim 9, further comprising:
    receiving a notification that the instance of E2 Termination is deployed at the Near-RT RIC; and
    in response to receiving the notification, obtaining the first IP address of the instance of E2 Termination and mapping the first IP address of the instance of E2 Termination to the at least one second IP address of the at least one E2 node associated with the instance of E2 Termination.

13. The method according to claim 9, wherein the mapping comprises a table specifying the association between the first IP address of the instance of E2 Termination and the at least one second IP address of the at least one E2 node.

14. The method according to claim 9, wherein the at least one E2 node comprises at least one of an O-CU, an O-DU, and an O-eNB.

15. The method according to claim 9, further comprising, based on determining to directly transmit the data, directly transmitting the data to the instance of E2 Termination by bypassing one or more security elements.

16. The method according to claim 11, further comprising:
    in response to determining that the IP address of the E2 node corresponds to the IP address from among the at least one second IP address in the mapping, adding the IP address of the E2 node in a row of the corresponding IP address of the at least one second IP address in the mapping; and
    in response to determining that the IP address of the E2 node does not correspond to any of the at least one second IP address in the mapping, adding the IP address of the E2 node in a new row different from the at least one second IP address in the mapping.

17. A non-transitory computer-readable recording medium having recorded thereon instructions executable by at least one processor to cause the at least one processor to perform a method for forwarding E2 communication to a near-real-time radio access network (RAN) intelligent controller (Near-RT RIC), the method comprising:
    obtaining a mapping between a first IP address of an instance of E2 Termination deployed at the Near-RT RIC and at least one second IP address of at least one E2 node associated with the instance of E2 Termination;
    receiving data from an E2 node;
    determining whether to directly transmit the data to the instance of E2 Termination based on the mapping.

18. The non-transitory computer-readable recording medium according to claim 17, wherein the data is subjected to Internet Protocol Security (IPSec).

19. The non-transitory computer-readable recording medium according to claim 17, wherein the determining whether to directly transmit the data comprises:
    determining an IP address of the E2 node;
    determining whether or not the IP address of the E2 node corresponds to an IP address from among the at least one second IP address in the mapping;
    in response to determining that the IP address of the E2 node corresponds to the IP address from among the at least one second IP address in the mapping, directly transmitting the data to the instance of E2 Termination associated with the E2 node based on the mapping.

20. The non-transitory computer-readable recording medium according to claim 17, wherein the method further comprises, based on determining to directly transmit the data, directly transmitting the data to the instance of E2 Termination by bypassing one or more security elements.

* * * * *